US010857940B1

(12) United States Patent
Madden

(10) Patent No.: US 10,857,940 B1
(45) Date of Patent: Dec. 8, 2020

(54) SYSTEM AND METHOD FOR VEHICLE MONITORING

(71) Applicant: ObjectVideo Labs, LLC, Tysons, VA (US)

(72) Inventor: Donald Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/148,630

(22) Filed: Oct. 1, 2018

Related U.S. Application Data

(60) Provisional application No. 62/565,690, filed on Sep. 29, 2017.

(51) Int. Cl.
| | |
|---|---|
| *B60Q 9/00* | (2006.01) |
| *G06K 9/00* | (2006.01) |
| *H04N 5/247* | (2006.01) |
| *H04R 29/00* | (2006.01) |
| *G06T 7/70* | (2017.01) |
| *H04N 5/232* | (2006.01) |

(52) U.S. Cl.
CPC ......... *B60Q 9/002* (2013.01); *G06K 9/00791* (2013.01); *G06K 9/00832* (2013.01); *H04N 5/247* (2013.01); *G06T 7/70* (2017.01); *H04N 5/23238* (2013.01); *H04R 29/00* (2013.01)

(58) Field of Classification Search
CPC ...... B60Q 9/00; B60Q 9/002; G06K 9/00791; G06K 9/00832; H04N 5/247; H04N 5/23238; H04N 7/181; G06T 7/70; H04R 29/00; B60R 2300/8006; B60R 2300/802; B60R 2300/8066; B60R 2300/80

USPC ................................................ 340/438, 457
See application file for complete search history.

(56) References Cited

U.S. PATENT DOCUMENTS

| | | | |
|---|---|---|---|
| 6,505,873 B1* | 1/2003 | Crean ...................... | B60P 3/34 296/165 |
| 2005/0040939 A1* | 2/2005 | Jobes ....................... | B60Q 1/22 340/438 |
| 2007/0120707 A1* | 5/2007 | Donnelly ................. | G08G 1/02 340/933 |
| 2007/0240831 A1* | 10/2007 | Tran ..................... | E04F 10/0659 160/67 |
| 2014/0210593 A1* | 7/2014 | Cattermole ............ | G08C 17/02 340/5.61 |

(Continued)

*Primary Examiner* — Emily C Terrell
(74) *Attorney, Agent, or Firm* — Fish & Richardson P.C.

(57) ABSTRACT

Methods, systems, and apparatus, including computer programs encoded on a storage device, for monitoring a vehicle is disclosed. In one aspect, a vehicle monitoring system is disclosed that includes a processor and a storage device storing instructions that, when executed by the processor, causes the processor to perform operations. The operations may include obtaining data generated by a vehicle monitoring component, determining whether the parked vehicle is permitted to navigate away from a location where the vehicle is parked, and in response to determining that the parked vehicle is not permitted to navigate away from the location, providing alert data to a processing unit installed within the parked vehicle, wherein processing of the generated alert data by the processing unit triggers a notification that is configured to alert the vehicle operator that the parked vehicle is not permitted to navigate away from the location.

30 Claims, 3 Drawing Sheets

(56) References Cited

U.S. PATENT DOCUMENTS

2014/0247158 A1\* 9/2014 Tengler ................ H04W 4/029
340/901
2017/0161902 A1\* 6/2017 Patil ........................ B60Q 9/00

\* cited by examiner

SYSTEM AND METHOD FOR VEHICLE MONITORING

CROSS-REFERENCE TO RELATED APPLICATIONS

This application claims the benefit of U.S. Provisional Patent Application No. 62/565,690 filed Sep. 29, 2017 and entitled "System and Method For Vehicle Monitoring," which is incorporated herein by reference in its entirety.

BACKGROUND

Some vehicles such as recreational vehicles are intended to be driven (or towed) to a particular location and parked for an extended period of one or more days. In such instances, a person may modify the vehicle while the vehicle is parked. Modifications to the vehicle may include extending a slide-out to make the inside area of the vehicle bigger, connecting the vehicle to a freshwater supply, connecting the vehicle to a power supply, or the like. Moreover, once the vehicle is parked at a location wherein the vehicle is extended to reside for an extended period of one or more days, one or more persons may scatter one or more objects throughout the vehicle.

SUMMARY

According to at least one innovative aspect of the present disclosure, a vehicle monitoring system for monitoring a vehicle is disclosed. The vehicle monitoring system may include one or more processors, and one or more storage devices, the one or more storage devices storing instructions that, when executed by the one or more processors, cause the one or more processors to perform operations. The operations may include obtaining, by the vehicle monitoring system, data generated by one or more vehicle monitoring components of the vehicle monitoring system, determining, by the vehicle monitoring system and based on the obtained data, whether the parked vehicle is permitted to navigate away from a location where the vehicle is parked, and in response to determining, by the vehicle monitoring system and based on the obtained data, that the parked vehicle is not permitted to navigate away from the location where the vehicle is parked, providing, by the vehicle monitoring system, alert data to a processing unit installed within the parked vehicle, wherein processing of the generated alert data by the processing unit triggers a notification that is configured to alert the vehicle operator that the parked vehicle is not permitted to navigate away from the location where the vehicle is parked.

Other aspects include corresponding methods, apparatus, and computer programs to perform actions of methods defined by instructions encoded on computer storage devices.

These and other versions may optionally include one or more of the following features. For instance, in some implementations, the operations may further include obtaining, by the vehicle monitoring system, a different set of data generated by one or more vehicle monitoring components of the vehicle monitoring system, and in response to determining, by the vehicle monitoring system and based on the obtained different set of data, that the parked vehicle is permitted to navigate away from the location where the vehicle is parked, providing, by the vehicle monitoring system, alert data to a processing unit installed within the parked vehicle, wherein processing of the alert data by the processing unit triggers a notification that is configured to alert the vehicle operator that the parked vehicle is permitted to navigate away from the location where the vehicle is parked.

In some implementations, the one or more vehicle monitoring components may include (i) one or more cameras installed proximate to an inside surface of the parked vehicle that are configured to capture image data of one or more portions of an inside portion of the parked vehicle or (ii) one or more cameras installed proximate to an outside surface of the parked vehicle that are configured to capture image data of one or more portions of an environment that surrounds a perimeter of the parked vehicle. In such implementations, obtaining, by a vehicle monitoring system, data generated by one or more vehicle monitoring components of the vehicle monitoring system may include obtaining, by the vehicle monitoring system, image data that is based on one or more images generated by (i) the one or more cameras installed proximate to an inside surface of the parked vehicle or (ii) the one or more cameras installed proximate to an outside surface of the parked vehicle.

In some implementations, the image data may include (i) an image or a video or (ii) data from the one or more cameras indicating that the one or more cameras detected an object.

In some implementations, determining, by the vehicle monitoring system and based on the obtained data, whether the parked vehicle is permitted to navigate away from a location where the vehicle is parked may include determining, based on the image data obtained from the one or more cameras installed proximate to an outside surface of the parked vehicle, that (i) an appendage of the parked vehicle is coupled to one or more coupling points external to the parked vehicle (ii) an extendable portion of the parked vehicle is currently in an extended configuration, or (iii) an object that is within a forward or rearward path of the parked vehicle, underneath the parked vehicle, or within a predetermined vicinity of the parked vehicle, and in response to determining, based on the image data from the one or more cameras installed proximate to an outside surface of the parked vehicle, that (i) an appendage of the parked vehicle is coupled to one or more coupling points external to the parked vehicle or (ii) an extendable portion of the parked vehicle is currently in an extended configuration, determining, by the vehicle monitoring system, that the parked vehicle is not permitted to navigate away from the location where the vehicle is parked.

In some implementations, the appendage may include at least one of a water hose or pipe, a power cord, or a sewage hose or pipe, the extendable portion may include at least one of a slide-out extension, a pop-up extension, a ramp, an open compartment door, a set of stairs, a ladder, a stabilizing jack, and the object may include a wheel chock.

In some implementations, determining, by the vehicle monitoring system and based on the obtained data, whether the parked vehicle is permitted to navigate away from a location where the vehicle is parked may include determining, based on the image data obtained from the one or more cameras installed proximate to an inside surface of the parked vehicle, that one or more objects inside the vehicle are unsecured, and in response to determining, based on the image data from the one or more cameras installed proximate to an inside surface of the parked vehicle, that the parked vehicle includes one or more objects inside the vehicle that are unsecured, determining, by the vehicle monitoring system, that the parked vehicle is not permitted to navigate away from the location where the vehicle is parked.

In some implementations, the one or more objects inside the vehicle that are unsecured may include an object that is likely to be displaced in response to movements of the parked vehicle during navigation after the parked vehicle deploys from the location where the vehicle is parked.

In some implementations, the one or more vehicle monitoring components may include one or more sensors installed in the vehicle. In such implementations, obtaining, by a vehicle monitoring system, data generated by one or more vehicle monitoring components of the vehicle monitoring system may include obtaining, by the vehicle monitoring system, sensor data that is generated by the one or more sensors installed in the vehicle.

In some implementations, the one or more sensors may include at least one of an accelerometer or a microphone.

In some implementations, determining, by the vehicle monitoring system and based on the obtained data, whether the parked vehicle is permitted to navigate away from a location where the vehicle is parked may include determining, based on the sensor data obtained from one or more sensors installed in the vehicle, that one or more components of the parked vehicle are currently running, and in response to determining, based on the sensor data that is obtained from one or more sensors installed in the vehicle, that the one or more components of the parked vehicle are currently running, determining, by the vehicle monitoring system, that the parked vehicle is not permitted to navigate away from the location where the vehicle is parked.

In some implementations, the one or more components of the parked vehicle may include at least one of a motor other than the vehicle motor, an electric generator, or a water pump.

In some implementations, the operations may further include generating the alert data, wherein the generated alert data may include rendering data that, when rendered on a graphical user interface, creates a visual notification that is configured to alert a vehicle operator that the parked vehicle is not permitted to navigate way from the location where the vehicle is parked.

In some implementations, the operations may further include generating the alert data, wherein the generated alert data may include data that, when processed by the process unit, creates an audio notification that is configured to alert a vehicle operator that the parked vehicle is not permitted to navigate way from the location where the vehicle is parked.

In some implementations, the operations may further include generating the alert data, wherein the generated alert data may include rendering data that, when rendered on a graphical user interface, creates a visual notification that is configured to alert the vehicle operator that the parked vehicle is permitted to navigate away from the location where the vehicle is parked.

In some implementations, the operations may further include generating the alert data, wherein the generated alert data may include data that, when processed by the process unit, creates an audio notification that is configured to alert a vehicle operator that the parked vehicle is permitted to navigate way from the location where the vehicle is parked.

DETAILED DESCRIPTION

Figure 1:
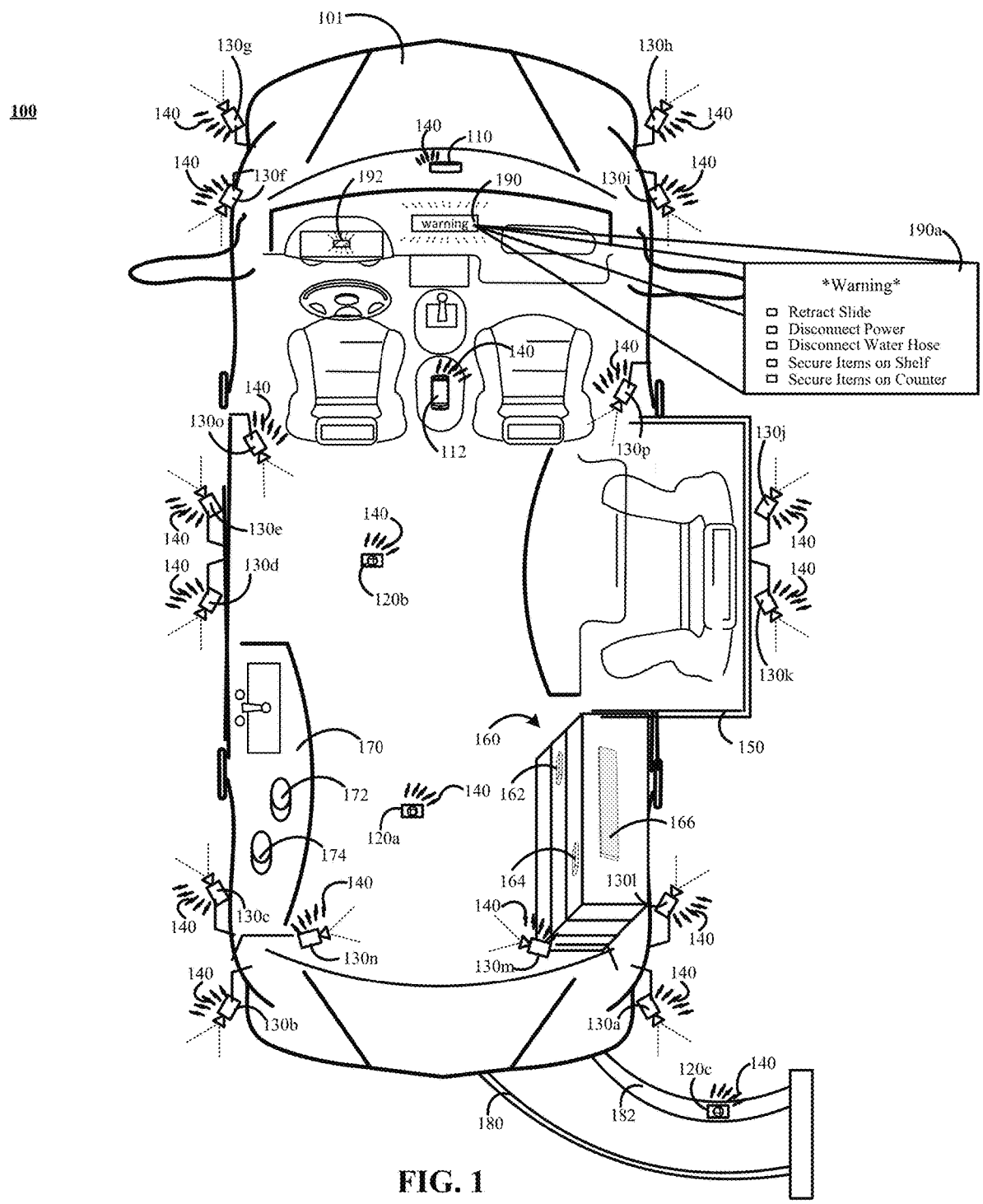
FIG. 1 is a contextual diagram of an example of a system for monitoring a vehicle.

The present disclosure is directed towards a system and method for monitoring a vehicle such as a recreational vehicle. Monitoring a vehicle may include, for example, using a monitoring unit to obtain and analyze sensor data generated by one or more sensors and image data from one or more cameras to assist with tearing down a vehicle that has been parked at a location for an extended period of time. The monitoring unit can perform image analytics on image data (e.g., still images or video images) captured by the one or more cameras to determine if the image data indicates an object may prohibit (e.g., not permit) the vehicle to safely navigate from the location where the vehicle is parked. For example, the image data may be analyzed to determine if the image data depicts an indication that the vehicle's slide-out is extended, the vehicle is connected to a power source, the vehicle is connected to a fresh water source, an exterior door of a compartment is open, stairs are deployed, a ladder is deployed, stabilizing jacks are deployed, wheel choks are placed by wheels, other foreign objects are located under the vehicle, other foreign objects are located in the vehicle's path, or the like. In the event that the monitoring unit determines that the results of the image analysis indicate that it is not safe for the vehicle to navigate from the location where the vehicle is parked, the monitoring unit can generate and transmit a notification to the user. The notification may be displayed on a heads-up display of the vehicle, on a graphical user interface of a user device (e.g., a smartphone, smartwatch, tablet, or the like), or a combination thereof, to alert the driver (or other person) to perform one or more tasks before navigating the vehicle from the location where the vehicle is parked.

The system and method of the present disclosure can also monitoring the inside of a vehicle. In some implementations, a monitoring unit can obtain and analyze sensor data generated by one or more sensors and image data from one or more cameras to determine if the inside of the vehicle is prepared for navigating from a location where the vehicle is parked. For example, the image data may be analyzed to determine if the image data depicts unsecured objects on a kitchenette counter, one or more unsecured objects on a table top, one or more unsecured objects on a shelf, an open cupboard, or the like. In event that the monitoring unit determines that the results of the image analysis indicate that there are one or more unsecured objects inside the vehicle, the monitoring unit can generate and transmit a notification to the user. The notification may be displayed on a heads-up display of the vehicle, on a graphical user interface of a user device (e.g., a smartphone, a smartwatch, a tablet, or the like), or a combination thereof, to alert the driver (or other person) to secure the one or more unsecured objects before navigating the vehicle from the location where the vehicle is parked.

In some implementations, the system and method of the present disclosure can also be used to set-up a vehicle once the vehicle arrives at location where the vehicle will park for an extended period of time. For example, as a vehicle such as a recreation vehicle arrives at a campsite, the recreational vehicle may use one or more cameras to capture image data of the environment surrounding the vehicle. A monitoring unit can obtain the image data, analyze the image data, and determine whether one or more particular objects exist in the obtained images. For example, the monitoring unit can analyze the image data to detect objects such as fire pits, picnic tables, electricity hook-ups, fresh water hook-ups, waste-water hook-ups, or the like. The monitoring unit can determine the location of the detected objects based on the camera that captured the image data, the orientation of the vehicle when the image was captured, or a combination thereof. The monitoring unit can generate and transmit a notification to a driver (or other person) that indicates an optimal spot for parking the vehicle.

In one or more of the aforementioned implementations, monitoring unit can generate a 360° view of the perimeter of the vehicle based on image data captured by one or more of the vehicle's cameras. The 360° view may allow a driver (or other person) to analyze the surrounding environment during set-up, tear-down, or other scenarios. In some implementations, the 360° may be modified to include graphical indications of one or more objects detected by the monitoring unit. In some implementations, the driver (or other person) may request that the 360° view be displayed before, after, or in addition to one or more notifications from monitoring unit.

FIG. 1 is a contextual diagram of an example of a monitoring system 100 for monitoring a vehicle 101. The monitoring system 100 may include a monitoring unit 110, one or more sensors 120a, 120b, 120c, one or more cameras 130a, 130b, 130c, 130d, 130e, 130f, 130g, 130h, 130i, 130j, 130k, 130l, 130m, 130n, 130o, 130p, a local network 140, and a heads-up display 190, 192. In some implementations, the monitoring system 100 may also include a user device 112 such as a smartphone, a smartwatch, a tablet, a laptop, or the like.

The monitoring unit 110 is a computing device that is configured to detect sensor data generated by one or more sensors 120a, 120b, 120 and image data generated by one or more cameras 130a, 130b, 130c, 130d, 130e, 130f, 130g, 130h, 130i, 130j, 130k, 130l, 130m, 130n, 130o, 130p. For example, the monitoring unit 110 can determine that one or more motors (e.g., electric generator motor, water pump motor, sewage pump motor, or other motors other than the vehicle motor) are running based on sensor data. For example, the monitoring unit 110 can detect and interpret sensor data generated by an accelerometer based on vibrations in a floor and determine that the floor vibrations are caused by a motor running. Alternatively, or in addition, the monitoring unit 110 can determine whether the vehicle 110 is connected to a fresh water source based on sensor data. For example, the monitoring unit 110 can detect and interpret sensor data generated by an accelerometer based on vibrations of a water pump and determine the vibrations are caused by a water pump pumping water through a hose from a fresh water source.

Alternatively, or in addition, the monitoring unit 110 can analyze image data from the one or more cameras to determine whether the image data includes one or more particular objects. For example, the monitoring unit 110 can determine whether image data shows that a power cord 180 is connected to a power source, whether a fresh water hose 182 is connected to a fresh water source, whether waste water hose is connected to a waste water disposal outlet, whether a slide-extension is extended or the like. Alternatively, or in addition, the monitoring unit 110 can be configured to analyze image data to determine whether the image data shows objects around the perimeter of the vehicle 101 such as fire pits, picnic tables, power source, fresh water source, waste water disposal outlet, one or more persons, a tent, or the like. Alternatively, or in addition, one or more of the cameras may be configured to analyze image data to determine whether the image data shows one or more unsecured objects inside the vehicle. The monitoring system may be configured to generate one or more notifications based on the detected sensor data, image data, or both.

The one or more sensors 120a, 120b may be strategically placed inside the vehicle 101 proximate to an inside surface (e.g., wall, ceiling, or floor) of the vehicle 101 or proximate to a surface of one or more objects residing in the vehicle. Alternatively, or in addition, the one or more sensors 120c may be strategically placed outside the vehicle 101 proximate to an outer surface (e.g., outer sidewall of the vehicle 121, under an outer surface of the vehicle 101 such as under the hood of the vehicle 101, or the like) or outside of the vehicle 101 on one or more vehicle appendages (e.g., a water hose or pipe, a power cord, a sewage hose or pipe, or the like) or extendable portions (e.g., a slide-out extension, a pop-up extension, a ramp, or the like). In some implementations, the sensors 120a, 120b, 120c may be placed both inside and outside the vehicle 101 so that the sensors can generate sensor data that can be obtained and analyzed by the vehicle monitoring unit 110 so that the vehicle monitoring unit 110 can sense attributes related to the vehicle 101.

The one or more sensors 120a, 120b, 120c, may include a combination of different types of sensors such as accelerometers, microphones, or both. For example, the sensor 120a may include a microphone that is configured to detect electrical sounds indicative of one or more vehicle component running such as one or more motors running. Such motors may include the vehicle 101 motor, a water pump motor, an electrical generator motor, or the like. The sensor 120b may include, for example, an accelerometer that is configured to detect vibrations in the floor in the vehicle 101. For example, the accelerometer 120b may be calibrated to detect vibrations in the floor of the vehicle that are indicative of the vehicle 101 motor running, the water pump motor running, the electrical generator motor running, or the like.

In some implementations a sensor 120a or 120b may be installed and calibrated for each respective type of motor vibration that the monitoring system 100 is configured to detect. For example, a motor of a particular device may produce a distinct vibration off one or surfaces of the vehicle 101. By way of example, a generator motor may cause a surface of a vehicle to vibrate in a first manner, a water pump motor may cause a surface of a vehicle to vibrate in a second manner, and yet other devices may cause a surface of the vehicle to vibrate in a third manner. In some implementations one or more dedicated microphones or accelerometers may be strategically placed and used to detect each vibration type. For example, a dedicated set of microphones, accelerometers, or both, may be placed on particular surfaces proximate to a motor or hose (or pipe) and sensor data generated by the dedicated set may be used by the vehicle monitoring system to monitor the particular motor or hose (or pipe). In other implementations, a set of microphones and accelerometers may generally be placed and used to detect all vibration types. For example, in some implementations, a single set of one or more microphones, accelerometers, or both, may be used to generate sensor data that can be used by the vehicle monitoring system to monitoring multiple different motors, hoses (or pipes), or the like.

FIG. 1 depicts an example of a sensor such as sensor 120c that is installed on a component of the vehicle 101 that resides outside the vehicle 101. For example, a sensor 120c such as an accelerometer 120c may be installed on a fresh water hose 182. The accelerometer may be configured to detect vibrations that occur in fresh water hose 182 that are indicative of the fresh water hose being 182 being connected to a water source. In some instances, where the movement of water within the fresh water hose 182 does not produce a vibration and the fresh water hose is still connected between the vehicle and the fresh water source, the monitoring unit may analyze image data from one or more cameras such as camera 130*a* to determine if the fresh water hose 182 is connected between the vehicle and the fresh water source.

Each sensor of the one or more sensors 120*a*, 120*b*, 120*c* is configured to generate and broadcast sensor data that is indicative of a respective attribute of the vehicle 101 that the sensor sensed. For example, an accelerometer may sense vibration and then generate and broadcast sensor data that is indicative of the sensed vibration. By way of another example, a microphone may sense audio data and then generate and broadcast sensor data that is indicative of the sensed audio data. The sensor data may be broadcast using the local network 140. The local network 140 may include one or more of a wireless LAN, a wireless WAN, a Wi-Fi network, a Z-Wave network, a ZigBee network, a cellular network, the Internet, or a combination thereof. The monitoring unit 110 is configured to detect and analyze sensor data that is broadcast by each of the one or more sensors 120*a*, 120*b*, 120*c*.

The one or more cameras 130*a*, 130*b*, 130*c*, 130*d*, 130*e*, 130*f*, 130*g*, 130*h*, 130*i*, 130*j*, 130*k*, 130*l*, 130*m*, 130*n*, 130*o*, 130*p* may be strategically placed inside and outside the vehicle 101 in order to capture image data related to the vehicle 101. For example, one or more cameras 130*a*, 130*b*, 130*c*, 130*d*, 130*e*, 130*f*, 130*g*, 130*h*, 130*i*, 130*j*, 130*k*, 130*l* may be installed proximate to an outside surface of the vehicle 101 and configured to capture image data outside the vehicle. By way of another example, one or more cameras 130*m*, 130*n*, 130*o*, 130*p* can be installed proximate to an inside surface of the vehicle 101 and configured to capture image data inside the vehicle. The image data captured by each respective camera 130*a*, 130*b*, 130*c*, 130*d*, 130*e*, 130*f*, 130*g*, 130*h*, 130*i*, 130*j*, 130*k*, 130*l*, 130*m*, 130*n*, 130*o*, 130*p* can be broadcast via the local network 140. The monitoring unit 110 is configured to detect and analyze image data that is broadcast by each one of the one or more cameras 130*a*, 130*b*, 130*c*, 130*d*, 130*e*, 130*f*, 130*g*, 130*h*, 130*i*, 130*j*, 130*k*, 130*l*, 130*m*, 130*n*, 130*o*, 130*p*.

The one or more cameras 130*a*, 130*b*, 130*c*, 130*d*, 130*e*, 130*f*, 130*g*, 130*h*, 130*i*, 130*j*, 130*k*, 130*l* can be used to capture image data during set-up of the vehicle and teardown of the vehicle. During set-up, the one or more cameras 130*a*, 130*b*, 130*c*, 130*d*, 130*e*, 130*f*, 130*g*, 130*h*, 130*i*, 130*j*, 130*k*, 130*l* can be configured to obtain image data of the surrounding perimeter of the vehicle 101. The monitoring unit 110 can analyze the obtained image data to identify one or more objects around the perimeter of the vehicle. Objects that the monitoring unit 110 may identify can include, for example, fire pits, picnic tables, fresh water connections, waste water connections, power connections, or the like. Alternatively, or in addition, the monitoring unit can analyze the obtained image data to identify one or more objects such as persons, animals, tents, or the like. The monitoring unit 110 can aggregate and analyze the image data captured by each of the one or more cameras 130*a*, 130*b*, 130*c*, 130*d*, 130*e*, 130*f*, 130*g*, 130*h*, 130*i*, 130*j*, 130*k*, 130*l*.

In some implementations, the image data obtained and analyzed by the vehicle monitoring unit 110 may include images or video generated by one or more of the respective cameras 130*a*, 130*b*, 130*c*, 130*d*, 130*e*, 130*f*, 130*g*, 130*h*, 130*i*, 130*j*, 130*k*, 130*l*. However, the present disclosure need not be so limited. In other implementations, the image data may include data representing a determination made by one or more of the respective cameras 130*a*, 130*b*, 130*c*, 130*d*, 130*e*, 130*f*, 130*g*, 130*h*, 130*i*, 130*j*, 130*k*, 130*l* based on the respective camera's analysis of a generated image or video. For example, one or more of the cameras 130*a*, 130*b*, 130*c*, 130*d*, 130*e*, 130*f*, 130*g*, 130*h*, 130*i*, 130*j*, 130*k*, 130*l* may store an image model that represents objects that can be detected by the camera. The image model may include, for example, a set of features describing an image (or video) of an object, a machine learning model that has been trained to detect objects in an image (or video), or even one or more stored images (or videos) of objects. By way of example, a camera such as camera 140 may store an image model representing a slide-out 150 that is extended. The camera 140 may generate an image (or video), obtain a set of features (e.g., isolated sets of pixels representing points of an image, curves of an image, continuous regions of an image, or the like), and determine a level of similarity between the obtained set of features and the stored image model. If the camera 140 determines that a similarity level between the obtained set of features and the stored image model representing an extended slide-out 150 satisfies a predetermined threshold, the camera 140 may determine that an extended slide-out 150 has been detected. The camera 140 can then broadcast image data representing a determination, by the camera 140, that indicates that the camera 140 detected an extended slide-out 150.

With reference to FIG. 1, a contextual example of using the monitoring system 100 during teardown of the vehicle 101 prior to a vehicle 101 navigating away from the location where the vehicle 101 is parked.

Assume, that a driver enters the vehicle 101 and attempts to start the vehicle 101 to navigate away from the location where the vehicle 101 is parked. In response to the driver's attempt to start the vehicle 101, the monitoring unit 110 may analyze sensor data and image data from outside and inside the vehicle 101 and determine whether the vehicle 101 is permitted to navigate away from the location where the vehicle 101 is parked. Alternatively, the driver (or other person) may submit a request for the monitoring unit 110 to analyze sensor data and image data from outside and inside the vehicle 101 and determine whether the vehicle is permitted to navigate away from the location where the vehicle 101 is parked.

In the example of FIG. 1, the monitoring unit 110 may obtain and analyze image data from cameras 130*a*, 130*b*, 130*c*, 130*d*, 130*e*, 130*f*, 130*g*, 130*h*, 130*i*, 130*j*, 130*k*, 130*l*. In such instances, the monitoring unit 110 may be configured to detect objects in image data that indicate that the vehicle 101 is not permitted to navigate aware form the location where the vehicle 101 is parked. Such objects may include connected power cords, connected hoses, extended slide-outs, objects blocking the vehicle's navigation path, objects underneath the vehicle, or the like. For example, the monitoring unit 110 can analyze image data from camera 130*a* and determine that image data depicts that the power cord 180 is stilled plugged-in to a generator, outlet, or the like and that the fresh water hose 182 is still plugged into a water source. Alternatively, or in addition the monitoring unit 110 can analyze image data from cameras 130*l*, 130*i* and determine that the slide-out extension 150 is still extended. The monitoring unit 110 can generate a plurality of one or more tasks that need to be performed by the driver (or other person) in order to prepare the vehicle 101 for navigation away from the location where it is parked based on the image analysis.

Alternatively, or in addition, the monitoring unit 110 can also analyze the inside of the vehicle 101 to determine whether the inside of the vehicle 101 is ready for navigation away from the location where the vehicle 101 is parked. For example, the monitoring unit 110 may obtain and analyze image data from one or more cameras 130m, 130n, 130o, 130p to determine whether there is one or more unsecured objects inside the vehicle 101. The monitoring unit 110 may detect unsecured objects by analyzing image data to determine whether the image data includes objects that are not strapped down, rounded objects resting on flat surfaces, objects of any shape resting on a flat surface and not in a storage bin, or the like. For example, the monitoring unit 110 can analyze image data from the camera 130m and determine that the cans of soda 172, 174 on the kitchenette counter 170 should be secured prior to vehicle 101 navigating away from the location where the vehicle 101 is parked.

Alternatively, or in addition, the monitoring unit 110 may analyze image data from the camera 130n and determine that the objects 162, 164, 166 on the shelves 160 should be stowed before the vehicle 101 navigates away from the location where the vehicle 101 is parked. Alternatively, or in addition, the monitoring unit 110 may compare a reference image depicting when the vehicle 101 is ready for navigation with a current image and determine that if the current image is sufficiently similar to the reference image, the vehicle 101 is ready for navigation. In the example, if the monitoring unit 101 determines that an object is detected in the current image that is not in the reference image, then the vehicle 101 is not ready for navigation and may provide a notification to the user showing the current image with an outline around the object or some other indication as to why the vehicle 101 is not ready for navigation.

The monitoring unit 110 may generate a notification 190a for display on one or more user interfaces that identifies one or more tasks that need to be performed before the vehicle 101 can navigate away from the location where the vehicle is parked. The user interfaces may include, for example, a vehicle 101 heads-up display 190 in the center console, a vehicle heads-up display on the instrument panel 192, or both. Alternatively, or in addition, the user interface may include a heads-up display that is projected onto the windshield of the vehicle 101. Alternatively, or in addition, the user interface may include a graphical user interface of a mobile device 112 such as a smartphone, smartwatch, a tablet, a laptop, or a combination thereof. One or more of the aforementioned interfaces may include capacitive touchscreen interfaces.

The notification 190a may identify each of the tasks that need to be performed before the vehicle 101 can be permitted to navigate away from the location wherein the vehicle 101 is parked. Identifying each of the tasks that need to be performed may include, for example, providing, for display, a list of tasks that the driver (or other person) needs to perform. In some implementations, for example, the list of tasks may be provided on a touch screen user interface for display as a list of tasks with an associated checkbox. In such implementations, the user may systematically select each task in the list of tasks upon completion of the task. In some implementations, the monitoring unit 110 may be configured to disable (or otherwise not allow the vehicle to be driven away) the vehicle until the driver (or other user) performs each of the tasks identified by the notification.

In the example of FIG. 1, the notification may identify the tasks of retracting the slide-on 150, disconnecting the power cord 180, disconnecting the fresh water hose 182, securing items on the shelves 160, and securing items on the kitchenette counter 170. Performing each of these tasks by the driver (or other user) may ensure that the vehicle 101 can safely be able to navigate away from the location where the vehicle 101 is parked. By ensuring the vehicle 101 is safe to navigate away from the location where the vehicle was parked, the monitoring system 100 may protect the vehicle from damage and occupants of the vehicle from harm. Such damage can arise when a driver, without the benefit of the monitoring system 100, navigates away from the location where the vehicle is parked without, for example, disconnecting a fresh water hose or without closing the slide-out extension.

Figure 2:
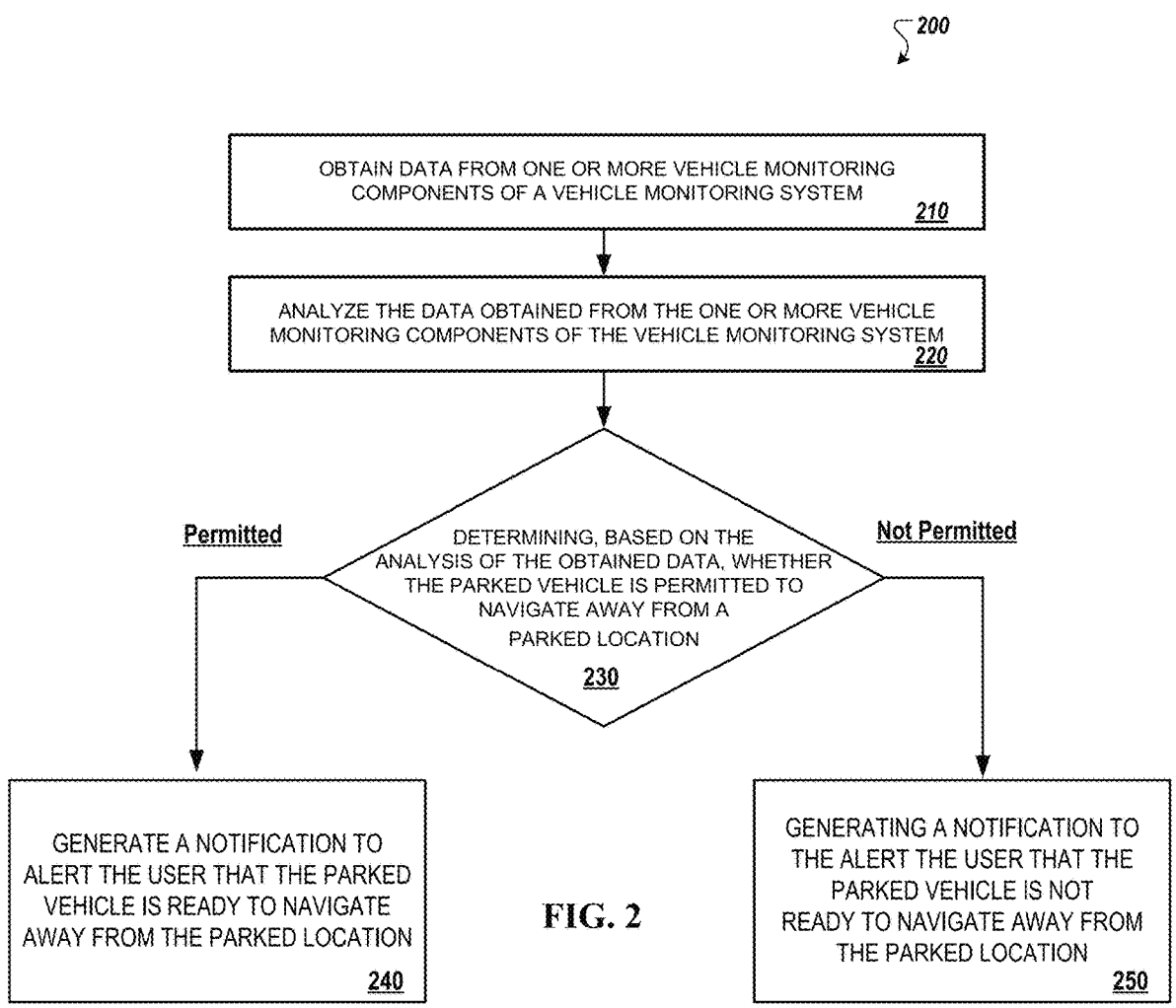
FIG. 2 is a flowchart of an example of a process for tearing down a vehicle that has been parked at a location for an extended period.

FIG. 2 is a flowchart of an example of a process 200 for tearing down a vehicle that has been parked at a location for an extended period. Generally, the process 200 includes obtaining data from one or more vehicle monitoring components of a vehicle monitoring system (210), analyzing the data obtained from one or more vehicle monitoring components of the vehicle monitoring system (220), and determining, based on the analysis of the obtained data, whether the parked vehicle is permitted to navigate away from the parked location (230). In response to determining that the vehicle is permitted to navigate away from the parked location, generating a notification to alert the user that the parked vehicle is ready for deployment (240). Alternatively, in response to determining that the vehicle is not permitted to navigate away from the parked location, generating a notification to alert the user that the parked vehicle is not permitted to deploy (250). For convenience, the process 200 will be described below as being performed by a monitoring unit such as the monitoring unit 110 of FIG. 1.

In more detail, a monitoring unit can begin performance of the process 200 by obtaining 210 data from one or more vehicle monitoring components of a vehicle monitoring system. Obtaining data from one or more vehicle monitoring components may include, for example, obtaining sensor data generated by one or more sensors installed inside the vehicle, outside the vehicle, or both. The sensors may include, for example, an accelerometer that is configured to detect vibrations of one or more surfaces of the vehicle, vibrations in one or more hoses connected to the vehicle, or the like. The sensors may also include, for example, a microphone that is configured to detect audio data such as the electrical sounds generated by a motor.

Alternatively, or in addition, obtaining data from one or more vehicle monitoring components may include, for example, obtaining image data captured by one or more cameras that are installed inside the vehicle, outside the vehicle, or both. The cameras may be configured to capture low-resolution images (e.g., less than 720p video, less than 8MP images, or the like), high-resolution images (e.g., 720p video, 1080p video, 4K video, 8MP images, 12MP images, 20MP images, or the like), thermal images, or the like. The cameras may be equipped with night vision capabilities to capture night vision images. The outside cameras may be configured to capture images of the perimeter of the vehicle. The inside cameras may be configured to capture images of the inside of the vehicle.

The monitoring unit can analyze 220 the data obtained from one or more vehicle monitoring components. If the obtained data includes sensor data, the monitoring unit can analyze the sensor data to determine if the sensor data is indicative of use, by the vehicle, of one or more mechanical systems such as running of a motor, running of an electric generator, running of a water pump, or the like. For sensor data that includes vibration data from an accelerometer, the monitoring unit can compare the sensed vibration to known vibration signatures for one or more motors, one or more generators, one or more water pumps, or the like that are installed in the vehicle. Based on the comparison of the sensed vibration to the one or more known vibration signatures, the monitoring unit can determine whether one or more motors, one or more electrical generators, one or more water pumps, or other devices are being operated by the vehicle (or a person).

For sensor data that includes audio data from a microphone, the monitoring unit can compare the sensed audio data to know audio signatures for one or more motors, one or more generators, one or more water pumps, or the like that are installed in the vehicle. Based on the comparison of the sensed audio data to the one or more known audio signatures, the monitoring unit can determine whether one or more motors, one or more electrical generators, one or more water pumps, or other devices, are being operated by the vehicle (or a person).

If the obtained data includes image data, the monitoring unit can perform image analytics to determine whether one or more objects appear in the image data. Image analytics may include analytics perform on still images, analytics performed on video images, analytics performed on thermal images, analytics performed on night vision images, analytics performed on depth maps generated by one or more depth sensors, or the like. For cameras installed outside the vehicle (or for cameras installed inside the vehicle with a field of view of the outside of the vehicle), the image data may depict images of the perimeter of the vehicle. In such instances, the monitoring unit can analyze the images to detect objects connecting the vehicle to another structure (e.g., a water hose or pipe connecting the vehicle to a water source, a power cord connecting the vehicle to a power source, a sewage hose or pipe connecting to a waste disposal system, or the like). Alternatively, or in addition, in such instances, the monitoring unit can analyze images to detect the state of the vehicle such as, for example, whether one or more slide-out extensions, pop-up extensions, a ramp, or the like are currently extended, semi-extended, or not extended. Alternatively, or in addition, in such instances, the monitoring unit can analyze images to detect whether there are any obstacles under the vehicle (e.g., using images from one or more cameras mounted under the vehicle), any obstacles in front of the vehicle, or the like. Obstacles may include people, animals, tents, or any other inanimate objects. Alternatively, or in addition, the monitoring unit can perform depth sensing analytics using data captured by one or more depth sensors such as structured light, time-of-flight, or LIDAR can be used to detect, identify, and determine the position of objects in the vicinity of the vehicle.

For cameras installed inside the vehicle (or for cameras installed inside the vehicle with a field of view of the outside of the vehicle), the image data may depict images of the inside of the vehicle such as the objects scattered throughout the inside the vehicle, the countertops of a kitchenette, the tops of tables, the contents of shelves, or any other surface of the inside of the vehicle. The monitoring unit can perform image analytics on the image data to identify one or more unsecured objects on the inside of the vehicle. For example, the monitoring unit can analyze the image data to detect food containers on the kitchenette counter, boxes sitting on the edge of shelf, books left open on table top, bottles on a counter or table top, or any object that may not be secured and could shift, move, or fall in response to movement of the vehicle. By way of another example, the monitoring unit can perform depth sensing analytics using data captured by one or more depth sensors such as structured light, time-of-flight, or LIDAR can be used to detect, identify, and determine the position of objects inside the vehicle. Such data can provide an indication of an object's location on a counter, shelf, or the like.

The monitoring unit can determine 230, based on the analysis of the obtained data, whether the parked vehicle is permitted to navigate away from a parked location. In some implementations, the monitoring unit can make inferences based on the analysis of the obtained data to determine whether or not the parked vehicle is permitted to navigate away from the parked location. For example, the monitoring unit may determine that a vehicle is not permitted to navigate away from a parked location if it is determined, based on an analysis of sensor data, that one or more motors (other than the vehicle's engine) such as a motor of an electric generator, a water pump, or the like are running. Alternatively, or in addition, the monitoring unit may determine that the a vehicle is not permitted to navigate away from a parked location if it is determined, based on an analysis of image data, that (i) the vehicle is connected to another structure such as a water source, an electric source, or the like, (ii) the vehicle is not in a state that is suitable for driving (e.g., because the vehicle's slide-out extension, pop-out extension, or the like is fully, or partially, extended), (iii) there are one or more obstacles under the vehicle or in the vehicle's path, (iv) there are one or more unsecured objects on the inside of the vehicle, or (v) other detected electrical devices running that prohibit vehicle departure are determined to be running based on sensor data, (vi) other foreign objects were detected in image data prohibiting vehicle departure, or (vi) a combination thereof.

In response to determining that the parked vehicle is permitted to navigate away from the parked location, generating 240 a notification to alert a user that the parked vehicle is ready to navigate away from the parked location. For example, the monitoring unit may display an "All Clear" message, a "Go" message, or the like on a user interface in view of the driver (or other person). The user interface may include a vehicle heads-up display, a graphical user interface of a mobile device, or the like. Alternatively, the notification may be an audio notification that is output by via the speakers of the vehicle, a speaker of a mobile device, or the like.

In response to determining that the parked vehicle is not permitted to navigate away from the parked location, generating a notification 240 to alert a user that the parked vehicle is not permitted to navigate away from the parked location. For example, the monitoring unit may display a "Hazards Detected" message, a "Stop" message, or the like on a user interface in view of the driver (or other person). The user interface may include a vehicle heads-up display, a graphical user interface of a mobile device, or the like. Alternatively, the notification may be an audio notification that is output by via the speakers of the vehicle, a speaker of a mobile device, or the like.

Alternatively, or in addition, in some implementations, the monitoring unit may generate a task list that identify one or more tasks that need to be performed before the vehicle is permitted to navigate away from the parked location. For example, assume that it was determined at stages 220, 230, or both, that the vehicle is connected to a fresh water source, the vehicle's slide-out extension is partially extended, and that there are unsecured items on a shelf on the inside of the vehicle. The monitoring unit can generate a to-do list that may be executed before the vehicle is permitted to navigate away from the parked location. In the example identified immediately above, the to-do list may include instructions to (i) disconnect the vehicle's fresh water hose from the fresh water supply, (ii) retract the vehicle's slide-out extensions, (iii), and secure the unsecured items on the shelf.

The aforementioned process 200 for tearing down a vehicle that has been parked at a location for an extended period is generally directed towards preparing a vehicle to navigate away from a location where the vehicle has been parked. However the present disclosure need not be so limited. For example, in some implementations aspects of the process 200 can be used to analyze the inside of a vehicle that is currently navigating from a first location to a second location.

By way of example, a monitoring unit may obtain data related to the interior of the vehicle from one or more vehicle monitoring components of a vehicle monitoring system. The obtained data may include image data from one or more cameras, depth sensors, or the like. The monitoring unit can analyze the obtained data using one or more types of image analytics and determine, based on the analysis of the obtained data, whether there is a risk of object movement inside the vehicle. Risk of object movement may exist, for example, if the monitoring unit determines based on the analysis of the obtained data that an object may slide off of a counter, an object may fall off of a shelf, a door (e.g., a bathroom door, cabinet door, or the like) may swing open, or the like. In response to the detection of a risk of object movement, the monitoring unit may alert an operator of the vehicle (or other occupant of the vehicle) to the risk of movement of the object.

The alert may be a textual message output on a vehicle heads-up-display or other vehicle information panel. Alternatively, or in addition, the alert may be a notification to a user device. Alternatively, or in addition, the alert may be an audio alert. Alternatively, or in addition, the alert may be an image or video that is output on a heads-up-display of the vehicle, a different information panel of the vehicle, a display of a user device, or other display that depicts an image (or video) of the inside of the vehicle and shows the object that is at risk of moving. In some implementations, the monitoring unit may prompt the operator of the vehicle to pull the vehicle off the road, and secure the object that is at risk of movement.

Figure 3:
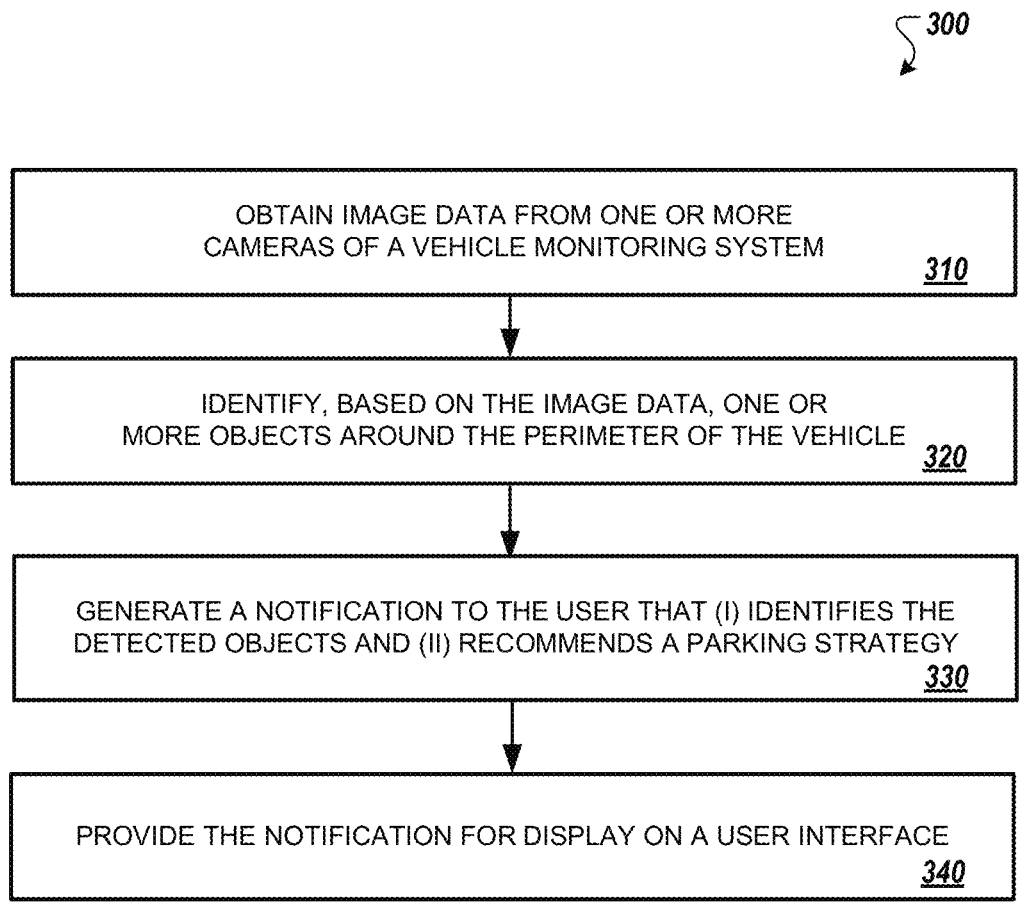
FIG. 3 is a flowchart of an example of a process for setting up a vehicle that has arrived at a location where the vehicle will park for an extended period.

FIG. 3 is a flowchart of an example of a process 300 for setting up a vehicle that has arrived at a location where the vehicle will park for an extended period. Generally, the process 300 includes obtaining image data from one or more cameras of a vehicle monitoring system (310), identifying, based on the image data, one or more objects around the perimeter of the vehicle (320), generating a notification to the user that (i) identifies the detected objects and (ii) recommends a parking strategy (330), and providing the notification for display on a user interface (340). For convenience, the process 200 will be described below as being performed by a monitoring unit such as the monitoring unit 110 of FIG. 1.

In more detail, the monitoring unit can begin performing the process 300 by obtaining 310 image data from one or more cameras of the vehicle monitoring system. Obtaining image data from one or more cameras of the vehicle monitoring system may include, for example, obtaining image data captured by one or more cameras that are installed outside the vehicle. Alternatively, the one or more cameras may be installed inside the vehicle but have a field-of-view of the outside of the vehicle. The cameras may be configured to capture low-resolution images (e.g., less than 720p video, less than 8MP images, or the like), high-resolution images (e.g., 720p video, 1080p video, 4K video, 8MP images, 12MP images, 20MP images, or the like), thermal images, or the like. The cameras may be equipped with night vision capabilities to capture night vision images. The image data may include images of the outdoor perimeter of the vehicle. Alternatively, or in addition, obtaining image data may also include obtaining data captured using one or more depth sensors.

The monitoring unit can identify 320, based on the image data, one or more objects around the perimeter of the vehicle. For example, the monitoring unit can perform image analytics to determine whether one or more objects appear in the image data. For example, the monitoring unit can analyze the image data, and determine whether one or more particular objects exit in the obtained images. For example, the monitoring unit can analyze the image data to detect objects such as fire pits, picnic tables, electricity hook-ups, fresh water hook-ups, waste-water hook-ups, or the like. Image analytics may include analytics perform on still images, analytics performed on video images, analytics performed on thermal images, analytics performed on night vision images, analytics performed on depth maps generated using one or more depth sensors, or the like. In addition, depth sensors may also be used, for example, to detect, identify, and determine the position of an object in an image.

The monitoring unit can generate a notification 330 to the user that (i) identifies the detected objects and (ii) recommends a parking strategy. For example, the notification may include one or more images of the perimeter of the vehicle that visually identifies objects detected at stage 320 such as one or more fire pits, picnic tables, electricity hook-ups, fresh water hook-ups, waste water hook-ups, or the like. Based on the location of the identified objects, the monitoring unit can also provide a recommendation with the notification that visually identifies an optimal spot for parking the vehicle. For example, the monitoring unit can determine the location of the identified objects based on the camera that captured the image data, the orientation of the vehicle when the image was captured, or a combination thereof. The monitoring unit can then determine an optimal spot for parking the vehicle based on the ports of the vehicle (e.g., power cord outlet, fresh water hose outlet, waste water hose outlet, vehicle doors, or the like), the location of the detected objects, or both. For example, the monitoring unit may select as "optimal," a parking spot that aligns one or more ports of the vehicle (e.g., power cord outlet) with one or more source structures (e.g., power source) detected by the monitoring unit. In some implementations, the images provided with the notification may a include 360° video of the perimeter of the vehicle. In some implementations, the 360° video may include visual identifiers that identify one or more objects detected by the monitoring unit, the optimal spot for parking the vehicle, or both.

The monitoring unit can provide 340 the notification for display on a user interface. For example, the monitoring unit may display the notification on a user interface in view of the driver (or other person). The user interface may include a vehicle heads-up display, a graphical user interface of a mobile device, or the like. Alternatively, the notification may be an audio notification that is output by via the speakers of the vehicle, a speaker of a mobile device, or the like.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method for monitoring a parked vehicle comprising:
    obtaining, by a vehicle monitoring system, image data generated by one or more cameras of the vehicle monitoring system;
    identifying, by the vehicle monitoring system and based on an analysis of the image data obtained from the one or more cameras, (i) a particular appendage of the parked vehicle that is coupled to one or more coupling points external to the parked vehicle and (ii) a particular extendable portion of the parked vehicle that is currently in an extended configuration;
    based on identifying, by the vehicle monitoring system and based on the analysis of the image data obtained from the one or more cameras, (i) the particular appendage of the parked vehicle that is coupled to one or more coupling points external to the parked vehicle and (ii) the particular extendable portion of the parked vehicle that is currently in an extended configuration, determining, by the vehicle monitoring system, that the parked vehicle is not permitted to navigate away from the location where the vehicle is parked; and
    in response to determining, by the vehicle monitoring system, that the parked vehicle is not permitted to navigate away from the location where the vehicle is parked, providing, by the vehicle monitoring system, alert data to a processing unit installed within the parked vehicle, wherein processing of the alert data by the processing unit triggers a notification that is configured to alert a vehicle operator that the parked vehicle is not permitted to navigate away from the location where the vehicle is parked, wherein the notification indicates (i) the particular appendage of the parked vehicle that is coupled to the one or more coupling points external to the parked vehicle and (ii) the particular extendable portion of the parked vehicle that is currently in the extended configuration.

2. The computer-implemented method of claim 1, the method further comprising:
    obtaining, by the vehicle monitoring system, a different set of data generated by one or more vehicle monitoring components of the vehicle monitoring system; and
    in response to determining, by the vehicle monitoring system and based on the obtained different set of data, that the parked vehicle is permitted to navigate away from the location where the vehicle is parked, providing, by the vehicle monitoring system, alert data to a processing unit installed within the parked vehicle, wherein processing of the alert data by the processing unit triggers a notification that is configured to alert the vehicle operator that the parked vehicle is permitted to navigate away from the location where the vehicle is parked.

3. The computer-implemented method of claim 1, wherein the one or more cameras include one or more cameras installed proximate to an inside surface of the parked vehicle that are configured to capture image data of one or more portions of an inside portion of the parked vehicle, and
    wherein obtaining, by a vehicle monitoring system, data generated by one or more cameras of the vehicle monitoring system comprises:
        obtaining, by the vehicle monitoring system, image data that is based on one or more images generated by the one or more cameras installed proximate to an inside surface of the parked vehicle.

4. The computer-implemented method of claim 1, wherein the image data includes (i) an image or a video or (ii) data from the one or more cameras indicating that the one or more cameras detected an object.

5. The computer-implemented method of claim 1, wherein the appendage includes at least one of a water hose or pipe, a power cord, or a sewage hose or pipe,
    wherein the extendable portion includes at least one of a slide-out extension, a pop-up extension, a ramp, an open compartment door, a set of stairs, a ladder, or a stabilizing jack.

6. The computer-implemented method of claim 3, the method further comprising:
    determining, based on the image data obtained from the one or more cameras installed proximate to an inside surface of the parked vehicle, that one or more objects inside the vehicle are unsecured; and
    in response to determining, based on the image data from the one or more cameras installed proximate to an inside surface of the parked vehicle, that the parked vehicle includes one or more objects inside the vehicle that are unsecured, determining, by the vehicle monitoring system, that the parked vehicle is not permitted to navigate away from the location where the vehicle is parked.

7. The computer-implemented method of claim 6, wherein the one or more objects inside the vehicle that are unsecured includes an object that is likely to be displaced in response to movements of the parked vehicle during navigation after the parked vehicle deploys from the location where the vehicle is parked.

8. The computer-implemented method of claim 1,
wherein the vehicle includes one or more sensors installed in the vehicle, and
wherein the method further comprises:
obtaining, by the vehicle monitoring system, sensor data that is generated by the one or more sensors installed in the vehicle.

9. The computer-implemented method of claim 8, the method further comprising:
determining, based on the sensor data obtained from the one or more sensors installed in the vehicle, that one or more components of the parked vehicle are currently running; and
in response to determining, based on the sensor data obtained from the one or more sensors installed in the vehicle, that the one or more components of the parked vehicle are currently running, determining, by the vehicle monitoring system, that the parked vehicle is not permitted to navigate away from the location where the vehicle is parked.

10. The computer-implemented method of claim 9, wherein the vehicle includes at least one of a motor other than the vehicle motor, an electric generator, or a water pump.

11. The computer-implemented method of claim 1, the method further comprising:
generating the alert data, wherein the generated alert data includes data that, when rendered on a graphical user interface, creates a visual notification that is configured to alert the vehicle operator that the parked vehicle is not permitted to navigate way from the location where the vehicle is parked.

12. The computer-implemented method of claim 1, the method further comprising:
generating the alert data, wherein the generated alert data includes data that, when processed by the process unit, creates an audio notification that is configured to alert the vehicle operator that the parked vehicle is not permitted to navigate way from the location where the vehicle is parked.

13. The computer-implemented method of claim 2, the method further comprising:
generating the alert data, wherein the generated alert data includes data that, when rendered on a graphical user interface, creates a visual notification that is configured to alert the vehicle operator that the parked vehicle is permitted to navigate away from the location where the vehicle is parked.

14. The computer-implemented method of claim 2, the method further comprising:
generating the alert data, wherein the generated alert data includes data that, when processed by the process unit, creates an audio notification that is configured to alert the vehicle operator that the parked vehicle is permitted to navigate way from the location where the vehicle is parked.

15. A vehicle monitoring system for monitoring a vehicle, the vehicle monitoring system comprising:
one or more processors; and
one or more storage devices storing instructions that, when executed by the one or more processors, cause the one or more processors to perform operations comprising:
obtaining, by the vehicle monitoring system, image data generated by one or more cameras of the vehicle monitoring system;
identifying, by the vehicle monitoring system and based on an analysis of the image data obtained from the one or more cameras, (i) a particular appendage of the vehicle that is coupled to one or more coupling points external to the vehicle or (ii) a particular extendable portion of the vehicle that is currently in an extended configuration;
based on identifying, by the vehicle monitoring system and based on the analysis of the image data obtained from the one or more cameras, (i) the particular appendage of the vehicle that is coupled to one or more coupling points external to the vehicle or (ii) the particular extendable portion of the vehicle that is currently in an extended configuration, determining, by the vehicle monitoring system, that the vehicle is not permitted to navigate away from the location where the vehicle is parked;
in response to determining, by the vehicle monitoring system, that the vehicle is not permitted to navigate away from the location where the vehicle is parked, providing, by the vehicle monitoring system, alert data to a processing unit installed within the vehicle, wherein processing of the alert data by the processing unit triggers a notification that is configured to alert the vehicle operator that the vehicle is not permitted to navigate away from the location where the vehicle is parked, wherein the notification indicates (i) the particular appendage of the vehicle that is coupled to the one or more coupling points external to the vehicle or (ii) the particular extendable portion of the vehicle that is currently in the extended configuration;
identifying, based on the analysis of the image data obtained from the one or more cameras, one or more objects around the perimeter of the vehicle;
generating notification data, wherein the generated notification data includes data that, when rendered on a graphical user interface, creates a visual notification that (i) identifies the objects and (ii) recommends a parking strategy; and
providing the notification data to the processing unit, wherein processing the notification data by the processing unit triggers the visual notification to be displayed on the graphical user interface.

16. The system of claim 15, the operations further comprising:
obtaining, by the vehicle monitoring system, a different set of data generated by one or more vehicle monitoring components of the vehicle monitoring system; and
in response to determining, by the vehicle monitoring system and based on the obtained different set of data, that the vehicle is permitted to navigate away from the location where the vehicle is parked, providing, by the vehicle monitoring system, alert data to a processing unit installed within the vehicle, wherein processing of the alert data by the processing unit triggers a notification that is configured to alert the vehicle operator that the vehicle is permitted to navigate away from the location where the vehicle is parked.

17. The system of claim 15,
wherein the one or more cameras include one or more cameras installed proximate to an inside surface of the vehicle that are configured to capture image data of one or more portions of an inside portion of the vehicle, and wherein obtaining, by a vehicle monitoring system, data generated by one or more cameras of the vehicle monitoring system comprises:
obtaining, by the vehicle monitoring system, image data that is based on one or more images generated by the one or more cameras installed proximate to an inside surface of the vehicle.

18. The system of claim 15, wherein the image data includes (i) an image or a video or (ii) data from the one or more cameras indicating that the one or more cameras detected an object.

19. The system of claim 15,
wherein the appendage includes at least one of a water hose or pipe, a power cord, or a sewage hose or pipe,
wherein the extendable portion includes at least one of a slide-out extension, a pop-up extension, a ramp, an open compartment door, a set of stairs, a ladder, or a stabilizing jack.

20. The system of claim 17, the operations further comprising:
determining, based on the image data obtained from the one or more cameras installed proximate to an inside surface of the vehicle, that one or more objects inside the vehicle are unsecured; and
in response to determining, based on the image data from the one or more cameras installed proximate to an inside surface of the vehicle, that the vehicle includes one or more objects inside the vehicle that are unsecured, determining, by the vehicle monitoring system, that the vehicle is not permitted to navigate away from the location where the vehicle is parked.

21. The system of claim 20, wherein the one or more objects inside the vehicle that are unsecured includes an object that is likely to be displaced in response to movements of the vehicle during navigation after the vehicle deploys from the location where the vehicle is parked.

22. The system of claim 15,
wherein the vehicle includes one or more sensors installed in the vehicle, and
wherein the operations further comprise:
obtaining, by the vehicle monitoring system, sensor data that is generated by the one or more sensors installed in the vehicle.

23. The system of claim 22, wherein the one or more sensors include at least one of an accelerometer or a microphone.

24. The system of claim 22, the operations further comprising:
determining, based on the sensor data obtained from one or more sensors installed in the vehicle, that one or more components of the vehicle are currently running; and
in response to determining, based on the sensor data that is obtained from one or more sensors installed in the vehicle, that the one or more components of the vehicle are currently running, determining, by the vehicle monitoring system, that the vehicle is not permitted to navigate away from the location where the vehicle is parked.

25. The system of claim 15, the operations further comprising:
generating the alert data, wherein the generated alert data includes data that, when rendered on a graphical user interface, creates a visual notification that is configured to alert the vehicle operator that the vehicle is not permitted to navigate way from the location where the vehicle is parked.

26. The system of claim 15, the operations further comprising:
generating the alert data, wherein the generated alert data includes data that, when processed by the process unit, creates an audio notification that is configured to alert the vehicle operator that the vehicle is not permitted to navigate way from the location where the vehicle is parked.

27. The system of claim 16, the operations further comprising:
generating the alert data, wherein the generated alert data includes data that, when rendered on a graphical user interface, creates a visual notification that is configured to alert the vehicle operator that the vehicle is permitted to navigate away from the location where the vehicle is parked.

28. A computer-readable storage device having stored thereon instructions, which, when executed by data processing apparatus, cause the data processing apparatus to perform operations comprising:
obtaining, by a vehicle monitoring system, image data generated by one or more cameras of the vehicle monitoring system;
identifying, by the vehicle monitoring system and based on an analysis of the image data obtained from the one or more cameras, (i) a particular appendage of a parked vehicle that is coupled to one or more coupling points external to the parked vehicle and (ii) a particular extendable portion of the parked vehicle that is currently in an extended configuration;
based on identifying, by the vehicle monitoring system and based on the analysis of the image data obtained from the one or more cameras, (i) the particular appendage of the parked vehicle that is coupled to one or more coupling points external to the parked vehicle and (ii) the particular extendable portion of the parked vehicle that is currently in an extended configuration, determining, by the vehicle monitoring system, that the parked vehicle is not permitted to navigate away from the location where the vehicle is parked; and
in response to determining, by the vehicle monitoring system, that the parked vehicle is not permitted to navigate away from the location where the vehicle is parked, providing, by the vehicle monitoring system, alert data to a processing unit installed within the parked vehicle, wherein processing of the alert data by the processing unit triggers a notification that is configured to alert a vehicle operator that the parked vehicle is not permitted to navigate away from the location where the vehicle is parked, wherein the notification indicates (i) the particular appendage of the parked vehicle that is coupled to the one or more coupling points external to the parked vehicle and (ii) the particular extendable portion of the parked vehicle that is currently in the extended configuration.

29. The computer-implemented method of claim 1, comprising:
in response to identifying (i) the particular appendage of the parked vehicle that is coupled to the one or more coupling points external to the parked vehicle and (ii) the particular extendable portion of the parked vehicle that is currently in the extended configuration, identifying a task to be performed to permit the parked vehicle to navigate away from the location, wherein the notification indicates the task.

30. The computer-implemented method of claim 29, comprising:

in response to determining, by the vehicle monitoring system, that the parked vehicle is not permitted to navigate away from the location where the vehicle is parked, inhibiting the parked vehicle from navigating away from the location where the vehicle is parked;

determining that the task has been performed; and in response to determining that the task has been performed, enabling the vehicle to navigate away from the location.

* * * * *